No. 623,991. Patented May 2, 1899.
W. R. CUNNINGHAM & T. MAJOR.
VOTING MACHINE.
(Application filed Aug. 3, 1897.)
(No Model.) 5 Sheets—Sheet 1.
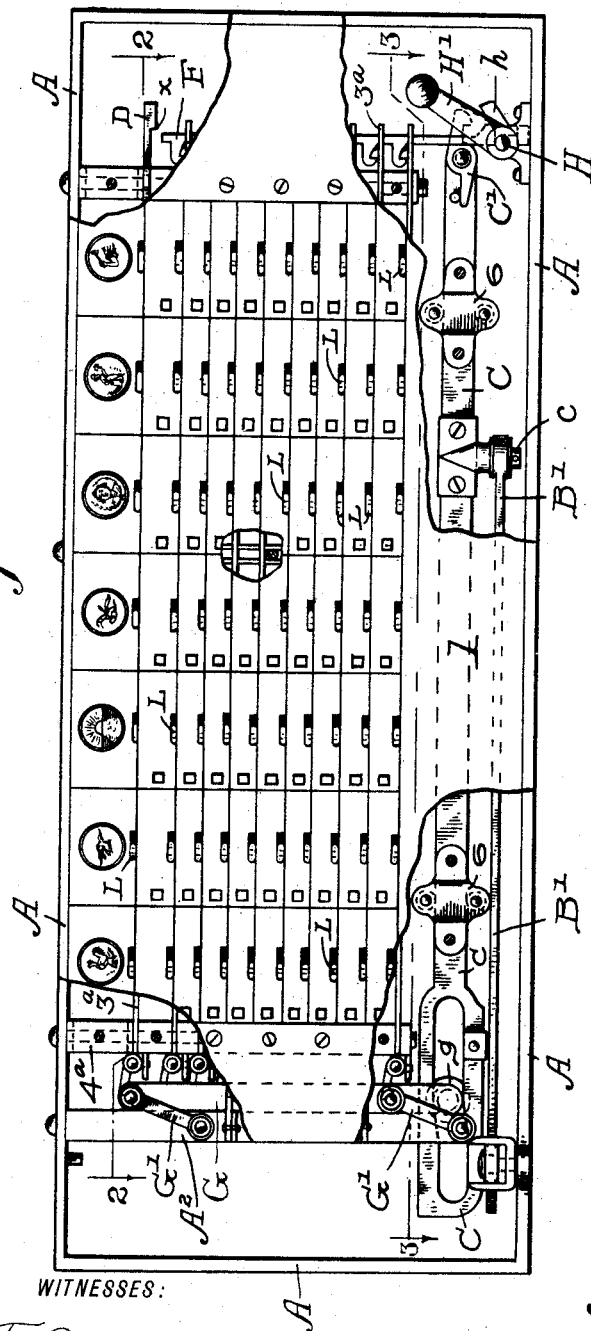
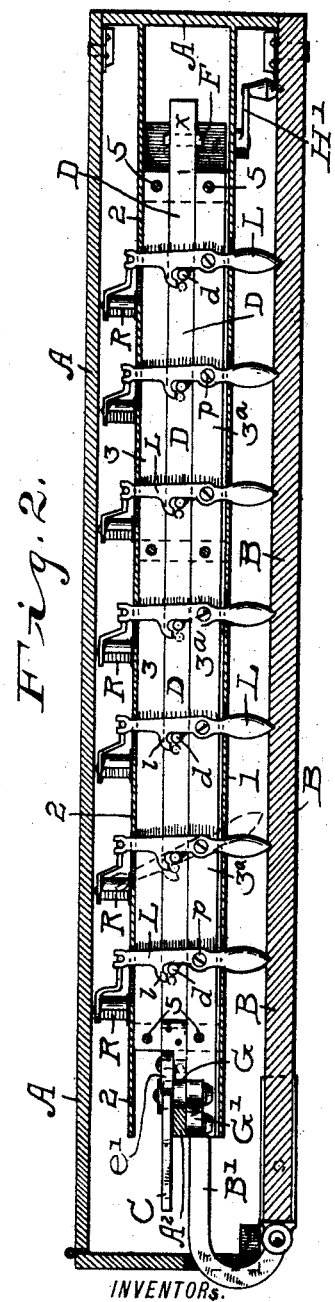
WITNESSES:
F. W. Woerner,
J. A. Walsh.
INVENTORS:
William R. Cunningham
and Thomas Major,
BY
Chester Bradford.
ATTORNEY.

No. 623,991. Patented May 2, 1899.
W. R. CUNNINGHAM & T. MAJOR.
VOTING MACHINE.
(Application filed Aug. 3, 1897.)
(No Model.) 5 Sheets—Sheet 2.
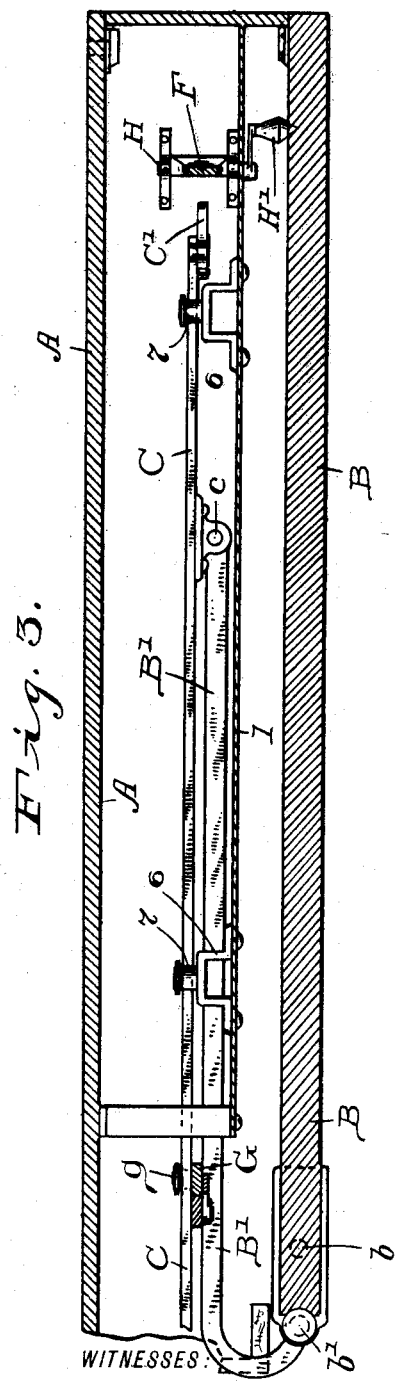
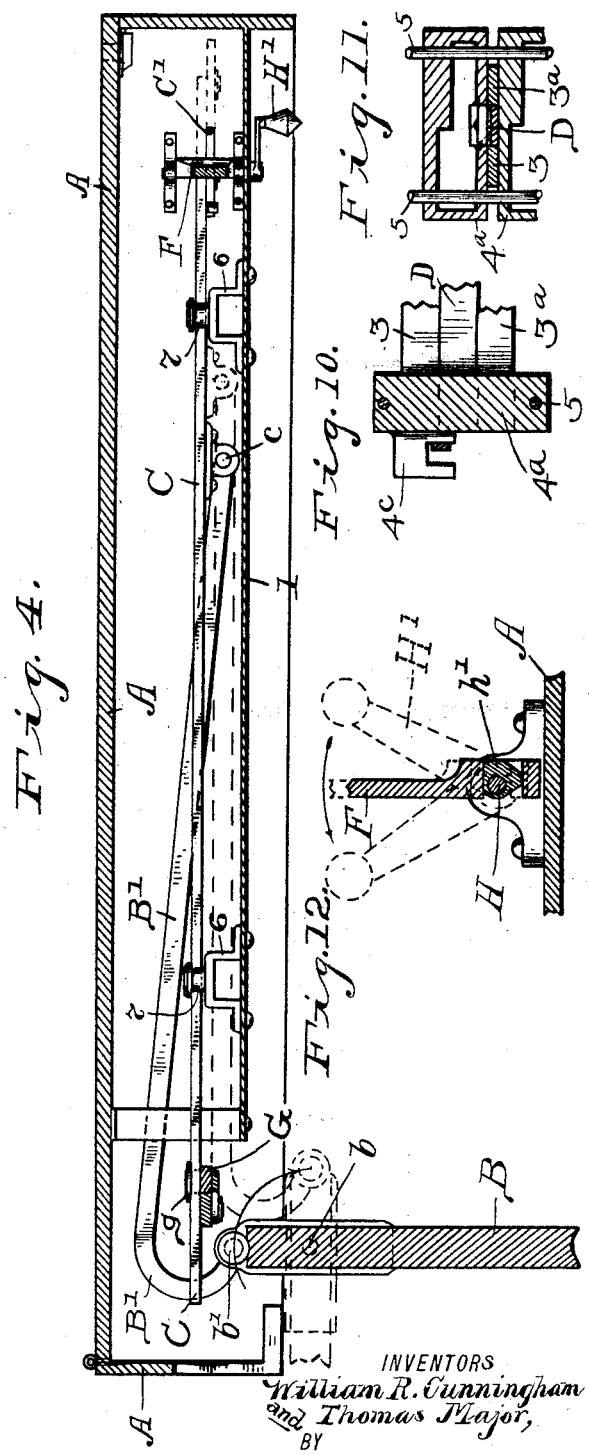
WITNESSES:
F. W. Werner
J. A. Walsh
INVENTORS
William R. Cunningham
and Thomas Major,
BY
Chester Bradford,
ATTORNEY.
THE NORRIS PETERS CO., PHOTO-LITHO., WASHINGTON, D. C.

No. 623,991. Patented May 2, 1899.
W. R. CUNNINGHAM & T. MAJOR.
VOTING MACHINE.
(Application filed Aug. 3, 1897.)
(No Model.) 5 Sheets—Sheet 3.
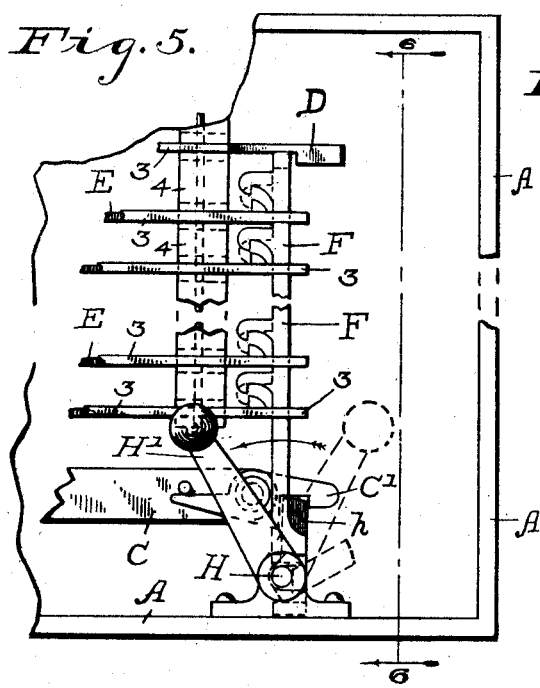
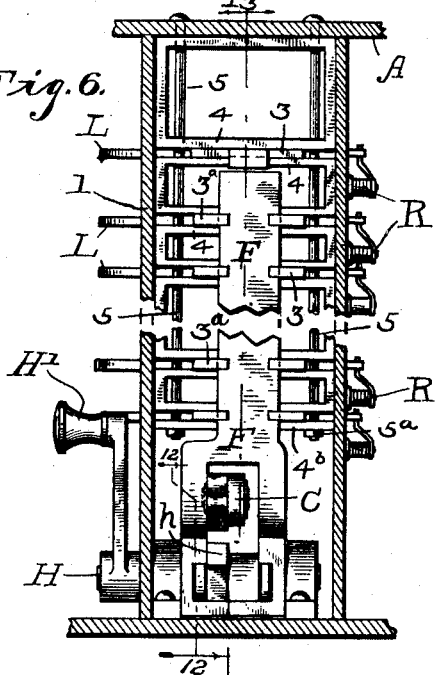
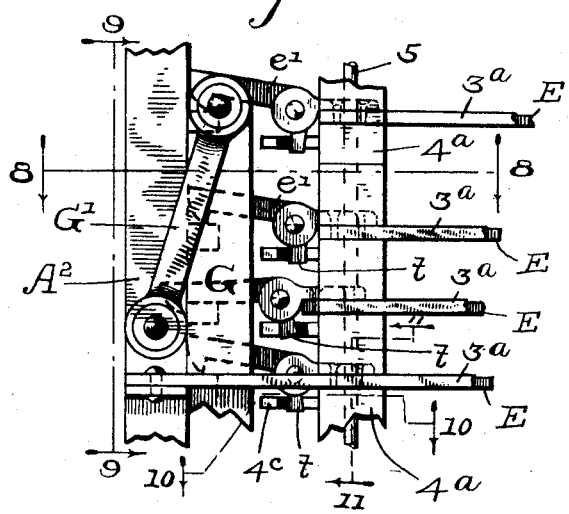
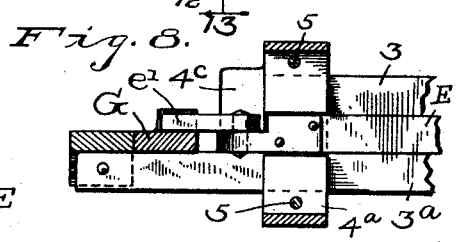
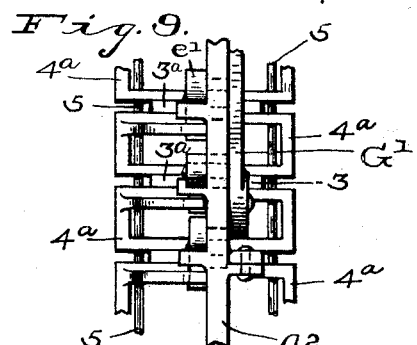
WITNESSES:
F. W. Woerner
J. A. Walsh
INVENTORS
William R. Cunningham
and Thomas Major,
BY
Chester Bradford,
ATTORNEY.
THE NORRIS PETERS CO., PHOTO-LITHO., WASHINGTON, D. C.

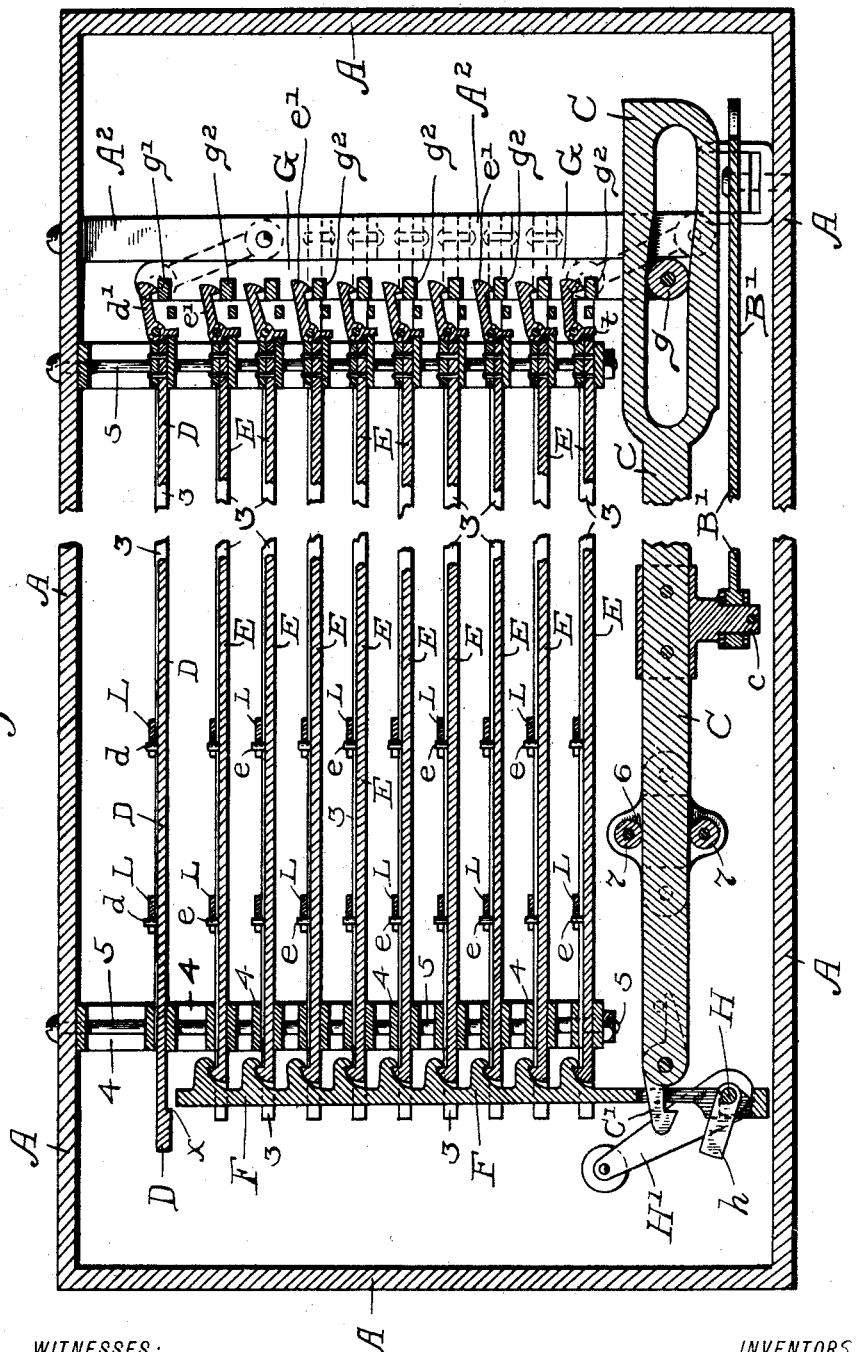

No. 623,991. Patented May 2, 1899.
W. R. CUNNINGHAM & T. MAJOR.
VOTING MACHINE.
(Application filed Aug. 3, 1897.)
(No Model.) 5 Sheets—Sheet 5.

WITNESSES:
F. W. Werner
J. A. Walsh

INVENTORS
William R. Cunningham,
and Thomas Major,
BY Chester Bradford,
ATTORNEY.

UNITED STATES PATENT OFFICE.

WILLIAM R. CUNNINGHAM AND THOMAS MAJOR, OF FRANKFORT, INDIANA.

VOTING-MACHINE.

SPECIFICATION forming part of Letters Patent No. 623,991, dated May 2, 1899.

Application filed August 3, 1897. Serial No. 646,935. (No model.)

*To all whom it may concern:*

Be it known that we, WILLIAM R. CUNNINGHAM and THOMAS MAJOR, citizens of the United States, residing at Frankfort, in the county of Clinton and State of Indiana, have invented certain new and useful Improvements in Voting-Machines, of which the following is a specification.

Our invention relates to that class of machines by the use of which persons may so cast their ballots in any given balloting that the same shall be counted or registered as the balloting proceeds, and while the voter has his choice in voting for any particular office he is effectually precluded from voting more than once for the same person or the same office. Said invention consists in the construction and arrangement of parts of such a machine whereby the various advantages sought are attained; and a machine embodying our said invention will now be fully described and the novel features thereof then pointed out in the claims.

Figure 16:
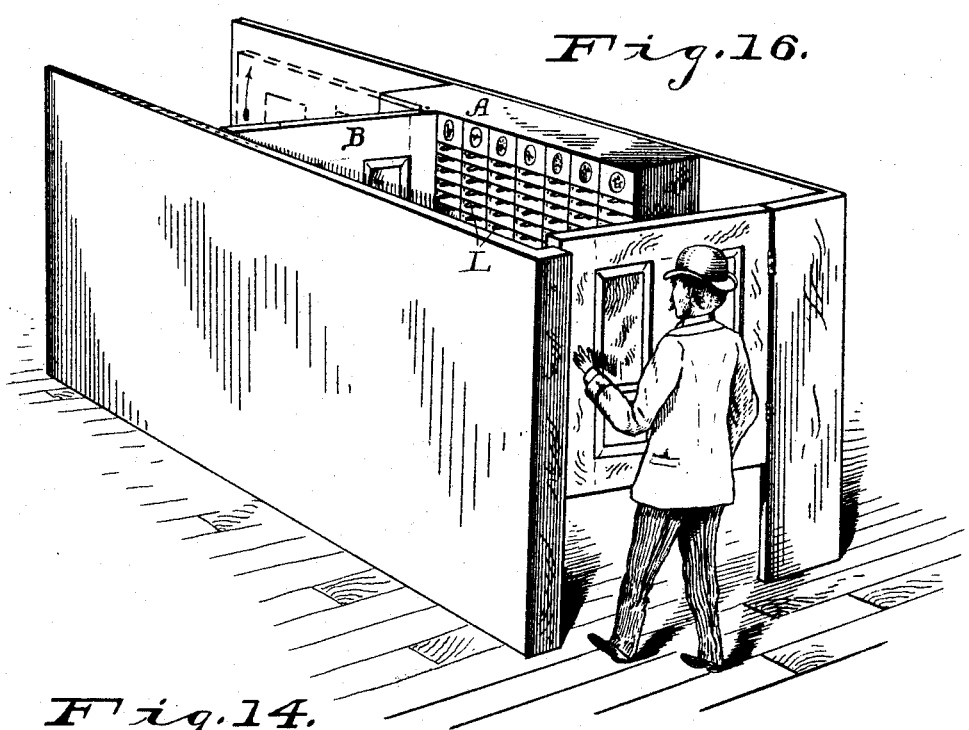
Figure 14:
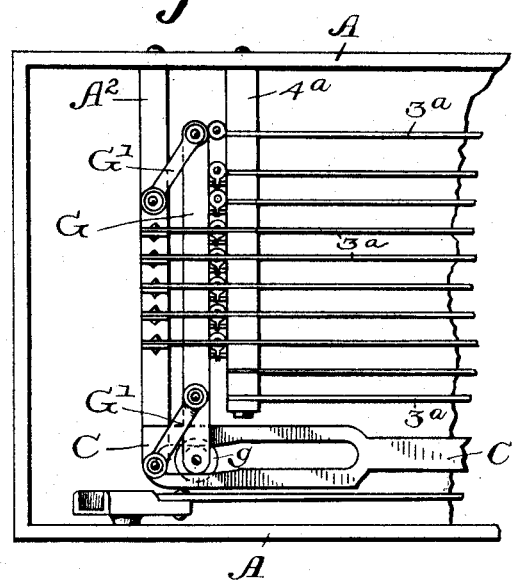
Figure 15:
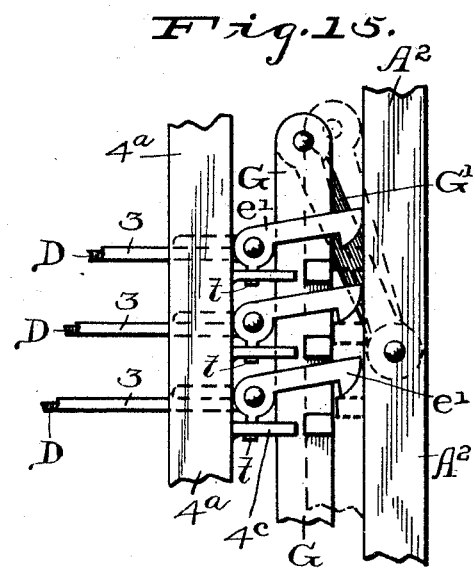

Referring to the accompanying drawings, which are made a part hereof and on which similar letters and figures of reference indicate similar parts, Figure 1 is a front elevation showing the face of our improved voting-machine with the door removed, thus illustrating that face, (omitting names of parties and candidates,) which is displayed to the voter, except that certain portions of said face are broken away to show the mechanism behind it; Fig. 2, a horizontal sectional view through the machine when the door is closed as seen when looking downwardly from the dotted line 2 2 in Fig. 1; Fig. 3, a similar view as seen from the dotted line 3 3; Fig. 4, a view similar to Fig. 3 except that the door is open or at right angles therewith, as when the booth containing such a machine is prepared for the use of the voter, being in this particular more similar to Fig. 1, as shown; Fig. 5, a view, on an enlarged scale, similar to the right-hand end of Fig. 1, but with the face-plate entirely removed and the mechanism in another position; Fig. 6, a detail elevation of the mechanism as seen from the dotted line 6 6 in Fig. 5, but with the vertical bar in the position shown in Fig. 1; Fig. 7, a fragmentary view, on an enlarged scale, of certain of the mechanism at the left-hand end of the machine, being similar to some portions shown in Fig. 1; Fig. 8, a horizontal sectional view as seen from the dotted line 8 8 in Fig. 7; Fig. 9, a fragmentary elevation as seen from the dotted line 9 9 in Fig. 7; Fig. 10, a detail sectional view as seen from the dotted line 10 10 in Fig. 7; Fig. 11, a detail sectional view as seen from the dotted line 11 11 in Fig. 7; Fig. 12, a detail sectional view as seen from the dotted line 12 12 in Fig. 6; Fig. 13, a longitudinal sectional view with the central portion broken away as seen when looking in the direction indicated by the arrows from the dotted line 13 13 in Fig. 6; Fig. 14, a detail view similar to the left-hand end of Fig. 1 except that the parts are in a different position and the face-plate is entirely removed; Fig. 15, a detail view, on an enlarged scale, of the upper portion of the mechanism shown in Fig. 14, but from the rear or opposite side; and Fig. 16, a perspective view showing a complete voting-booth with our voting-machine therein and illustrating the operation and use of our invention.

In said drawings the portions marked A represent the outer portion of the machine; B, a door thereto; C, a bar operated by said door; D, a bar for locking the whole-ticket-voting levers of the series when one is operated; E, locking-bars for locking the individual-voting levers of a series when one is operated; F, a locking-bar whereby when the bar D is in operative condition the bars E are prevented from being moved, or vice versa; G, a locking-bar whereby a repetition of any voting is prevented, and H a rock-shaft whereby the locking-bar F is manipulated.

The frame A is preferably composed of metal strongly united, the parts being so connected as that it is impossible to disconnect the same from outside. The rear side is in the form of a door, as best indicated in Fig. 2, so that the registers R may be reached for inspection and adjustment when required. Said frame contains an interior framework composed of the plates 1 and 2, longitudinal bars 3 and 3$^a$, transverse rectangular frame parts 4 and 4$^a$, and vertical rods 5. These rods are shown as carried by the upper side of the frame A, and pass thence down through the rectangular frame parts 4 and 4$^a$ and the bars 4$^b$ at the bottom and bear nuts 5$^a$ upon their lower ends, which (the parts being properly assembled) will when turned up clamp the parts 3, 3ª, 4, 4ª, and 4ᵇ rigidly and strongly together, thus forming a supporting and guiding frame for the bars E. As best shown in Fig. 13, the voting-bars D and E are somewhat thinner than the frame-bars 3 and 3ª, so that they are enabled to pass freely between the frame parts 4 and 4ª, although the latter are tightly clamped upon said bars 3 and 3ª. Several of the bars 3ª extend to and are rigidly secured to a vertical frame part A².

The door B besides serving the ordinary purposes of a door and inclosing the mechanism, as when in the position shown in Fig. 2, is an important element in the operating mechanism of the machine. When closed, it engages with the upper row of voting-levers and also with the handle H', by which the locking-bar F is operated, and locks them all securely, as best shown in Fig. 2, so that when said door is closed the mechanism can by no possibility be operated or moved. The machine being comparatively light, it may be transported to any desired place, (as the rooms of a canvassing-board,) where the total votes cast at several voting-places are to be aggregated, and this arrangement insures that no movement shall take place in the mechanism, whether purposely or otherwise, after the door is closed at the conclusion of the voting until it is again opened, which can only be done by the election officers who carry the keys, and this obviously renders it impossible that there shall be any tampering with the machine which does not involve a destruction of the door or locks. By a comparison of Figs. 3 and 4 the operation of the door B (which is pivoted at $b$) upon the mechanism will be observed. A connecting-rod B' is pivoted at one end to the rear edge of the door, behind its pivot $b$, by means of a pivot $b'$ and to the bar C at the other end by means of a pivot $c$. When the door is closed, the bar C is thus carried to and held in one position. When the door is open and at right angles with the machine, as shown by the full lines in Fig. 4, (see also Fig. 16,) said bar is carried to and held in another position, and when swung entirely open, as shown by the dotted lines in Fig. 4, said bar is carried to and held in still another position, for purposes which will be presently explained.

As best shown in Figs. 1 and 13, the bar C is of a peculiar construction and is adapted to move longitudinally of the machine, being operated by the door B, as previously stated. It is carried from the frame-plate 1 by brackets 6, which are preferably provided with antifriction-rollers 7, as best shown in Figs. 3 and 4, as the immediate means of support for said bar. At one end said bar has a longitudinal slot which is horizontal at the ends but at different planes, while centrally the slot is inclined, the inclined portion uniting the two horizontal portions and making the slot as a whole a cam-slot. Entering this slot from the locking-bar G is a projection, the surface of which is preferably an antifriction-truck $g$, and the obvious effect of moving the bar C longitudinally is thus to give the locking-bar G a vertical movement, for purposes which will be presently described. Upon the other end of the bar C is a pivoted catch C', which is adapted to engage, when the parts are in proper relative position, with an arm $h$ on the rock-shaft H, which is thus held to the engaged position until the bar C is again moved. When the door is closed, the bar C is in the position shown in Fig. 3, and the locking-bar G is held up thereby. When the door is at right angles, as shown by the full lines in Fig. 4, the bar G is still held in its upper position, as shown in Fig. 1; but the catch C' on the end is projected to a position where the arm $h$ on the rock-shaft may engage therewith, if desired. When the door is swung entirely open, as shown by the dotted lines in Fig. 4, then the bar C is thrown forward and the rock-shaft H, through its arm $h$, is pushed over to the position shown in Fig. 1, and thus thrown out of engagement with the catch C', while the cam-slot has operated to pull down the locking-bar G to the position shown in Fig. 14. When the door B returns to the position at right angles to the machine, it operates to return the mechanism to position for use by the next voter, and completes the registry of the vote.

The locking-bar D is mounted between the upper set of the frame parts 3, 3ª, 4, and 4ª. At one end (at $a$) it is provided with a thickened or hook end, with which the upper end of the locking-bar F is adapted to engage, and at the other end is provided with a pivoted hook $d'$, which is adapted to engage with a catch $g'$ on the locking-bar G. As shown most plainly in Fig. 2, the bar D has a series of pins $d$ equal in number to the number of tickets to be voted, and extending across said bar D alongside said pins are a series of levers L, one for each pin and ticket. These levers are mounted on pivots $p$ in the frame-bars 3ª. The handle portions of said levers extend out through suitable slots in the plate 1 to a position where they can be conveniently grasped by the hand of the voter when the door B is open, while the other ends extend through similar slots in the plate 2 and engage with suitable counters or registers R. Each lever has extending out from its sides next the pin $d$ a projection $l$ of a peculiar form. The end of said projection is exactly in line with the side of the corresponding pin $d$ which is farthest from the handle of the lever. Nearer the body of the lever the projection is cut away to receive the pin when the particular lever is operated. In operation the voter who desires to vote a "straight" or single party ticket upon entering the booth selects his ticket by the emblem or inscription at the head thereof and moves the lever immediately below it until it occupies the position shown in dotted lines by the second lever from the left-hand end of Fig. 2. This forces the bar D along until its hook $d'$ falls over and engages with the detent $g'$ on the locking-bar G. At the same time the pins $d$, being rigid with the bar D, are all carried along, and the arrangement is such that at the end of the movement they are directly alongside the extreme ends of the projections $l$ on all of the other levers, and consequently all of said other levers are locked against being operated, while the engagement of the hook $d'$ with the detent $g'$ prevents the return of the bar D to position for voting until the machine is again set for that purpose. As the voter passes out of the booth he swings the door B to the position shown by the dotted lines in Fig. 4, which has the effect, through the bar C, to cause the locking-bar G to descend, thus freeing the hook $d'$ from engagement with the detent $g'$. The bar D is also by the same movement returned to position ready for another voter. The returning to position is effected by the descent of the locking-bar G, which, as shown, is mounted on links, which gives it a swinging motion, throwing it against the ends of the various voting-bars and forcing any of them which have been moved in the operation of voting back to initial position.

The locking-bars E are in many respects similar to the voting-bars D. As shown, perhaps most plainly in Fig. 13, however, instead of having the extended and thickened end $x$ of the bar D they have upwardly-turned hook ends, which engage with corresponding hooks on the locking-bar F when said locking-bar is in the proper position to engage therewith. When, however, said locking-bar F is raised, then each and all said locking-bars E are adapted to be moved longitudinally and engaged, respectively, with the corresponding detents $g^2$ on the locking-bar G. The pins $e$ correspond to the pins $d$, and the levers L are the same as the corresponding levers to the bar D, except that the handles are not quite so long, and therefore are not engaged by the door B when said door is closed, as are the levers to the bar D, as shown in Fig. 2. The catches $e'$ correspond exactly to the catch $d'$. In order to insure absolute uniformity of movement and entire certainty of engagement and disengagement, these catches are provided with tailpieces $t$, as best shown in Fig. 7, and projections $4^c$ on the frame parts $4^a$ pass astride these tailpieces, and thus as the bars D and E are moved back and forth the catches $d'$ and $e'$ are forced up and down by said tailpieces $t$ coming in contact with the adjacent surfaces of said projections. In Fig. 7 the upper and lower bars E are shown in their normal position ready to be moved by the voter in the operation of voting, and, as will be noticed, the tailpieces $t$ rest firmly against the corresponding sides of the openings in the corresponding projecting arms $4^c$, while the central one of the bars E is shown as thrown forward, as when the voting has taken place, and the projection $t$ in this case is against the other side of the opening. Thus it will be seen that whichever position the bars occupy their catches are positively raised and lowered by this means.

The locking-bar F is provided for the purpose of securing the machine against more than one use by the same voter. In the position shown in Figs. 1 and 13 the locking-bars E are locked thereby, while the bar D is free to be operated. When this locking-bar F is raised, its upper end will engage with said bar D and lock it to position so that it cannot be used, and at the same time free all the locking-bars E. This is accomplished by the rotation of the rock-shaft H, which has a cam $h'$ thereon which is adapted to raise the locking-bar F, as best shown in Fig. 12.

The locking-bar G is carried by links $G'$ from the frame-part $A^2$ and is operated by the cam-slot in the end of the bar C, into which the projection (preferably carrying the antifriction-truck $g$) extends from said locking-bar G. This locking-bar has a detent $g'$ for the bar D and a series of detents $g^2$ for the locking-bars E, as many as may be desired, according to the number of names on the ticket. The operation involved in the engagement of the catches on these bars with these detents in the operation of voting has already been described. After the voting has been accomplished, however, the voter in leaving the booth, in swinging the door B to the position shown by the dotted lines in Fig. 4 through the bar C and its cam-slot, draws this locking-bar G downwardly, dropping the detents thereon away from the catches on the bars E, and at the same time, because of the links by which said locking-bar is carried, swings it outwardly from the frame part $A^2$, on which it is mounted, and the edge of said locking-bar next the ends of said bars strikes and forces them back to their initial positions, while the tailpieces on the catches of said bars strike the corresponding surfaces of the projections $4^c$, as hereinbefore described, and said catches are thereby raised.

The rock-shaft H is mounted in suitable bearings at the lower end of the locking-bar F, as heretofore stated. It has a cam $h'$, which engages suitably with the lower end of said locking-bar F, raising and lowering the same as the rock-shaft is moved from one position to the other, its range of movement being indicated by the dotted lines on Fig. 12, showing the positions of the handles at the extremes of the movements. It also has an arm $h$, which when it is turned so that the locking-bar F is raised and the bar D thereby locked engages with the pivoted catch $C'$ on the end of the bar C. Said pivoted catch is so arranged as to receive this arm freely, but not to allow it to be released until the bar C is again removed, as will be readily understood upon an examination especially of Fig. 13. When the bar C is moved, however, by the opening of the door B to the extreme position indicated by the dotted lines in Fig. 4, its end will push against the arm $h$, thus throwing the rock-shaft back to the position shown in Fig. 13, permitting the locking-bar F to descend and lock the bars E, while the bar D is released.

The operation of our machine may be briefly recapitulated as follows: The voter in entering the booth opens the ordinary door thereto and passes in. The booth has previously been arranged for voting by opening the door B, so as to stand squarely across the passage-way to the booth. If the voter desires to vote a straight ticket, he simply operates the lever L which is below the emblem or inscription indicating his selection of party, such an emblem or inscription, or both, being placed at the head of each vertical row of names to be voted for. This moves the bar D so that its thickened end $x$ is directly above the end of the locking-bar F, rendering it impossible to raise said locking-bar so long as the bar D remains in that position, and thus the bars E are locked against movement. The catch $d'$ on the other end of the bar D has meanwhile engaged with the detent $g'$ on the locking-bar G, while that counter or register R which is connected to the lever which has been manipulated by the voter is turned to position to register his vote. The voter then passes on out of the booth, swinging the door B to the position shown by the dotted lines in Fig. 4, which pushes back the bar C, (through the connecting-rod B',) forcing the locking-bar G downwardly, and which, by reason of its link-mounting, is also thrown backwardly, forcing said bar D, which has been moved in the operation of voting, back to its proper position ready for another voter. When the voter who has just voted has passed, the door B is also returned to position across the passage-way of the booth. When a voter desires to vote a mixed or "scratched" ticket, the operation is the same except that his first act upon entering the booth is to turn the rock-shaft H by means of its lever H', so that the locking-bar F is raised, locking the bar D and releasing the bars E. As before stated, after the rock-shaft H has been turned a detent $h$ thereon so engages with the bar C as that the voter can have no further control of said shaft. He then goes over the various names upon the several tickets, selecting one for each office, and operates the corresponding lever. As each lever is moved it throws the corresponding bar E along, so that its catch $e'$ engages with the corresponding detent $g^2$ on the locking-bar G, preventing any further manipulation of that bar. Having completed his selection of names and voted for all the candidates he desires to, he passes out, and the operation of the door in this case not only returns the locking-bars E to position, but operates the rock-shaft H back to its initial position.

As heretofore described, by reason of the peculiar arrangement of pins $d$ or $e$ and projections $l$ on the levers L it is impossible after one candidate has been voted for to vote for any other candidate for the same office, as all the other levers for operating that particular bar are securely locked against any movement sufficient to operate a register. By means of our invention, therefore, each individual vote is recorded as cast and duplicate voting is effectually prevented.

The entire absence of springs in our machine and the simplicity of the various parts secure that it shall remain in working order unless purposely broken, while its great strength (it being made solely of metal) is a large security against any purposeful demolition or disarrangement.

As will be noticed, especially by an examination of Fig. 1, the face of the machine corresponds closely to what is known as an "Australian ballot," with name rows running in both directions. In the arrangement shown the vertical rows represent the several party-tickets, and each such row has a party-emblem at its head. Each horizontal row contains the names of the candidates contesting for a particular office—as governor, lieutenant-governor, and the like. The names of course can be changed at each election to correspond with the nominations of the several parties. The registers are positioned directly behind the various name or party-ticket spaces. The counting is done by adding to the whole ticket or party vote the individual votes cast for each name under that party-heading. The counting or aggregating and tabulating of the vote is thus rendered very expeditious and the labor is light. In so brief and simple a mathematical work there is but little liability to error, and the registers can be used and reused in verifying until all possibility of question respecting the result is at an end.

Having thus fully described our said invention, what we claim as new, and desire to secure by Letters Patent, is—

1. The combination of the voting-booth formed with a passage with separate entrance and exit, the voting-machine therein comprising an inclosing casing independent of the booth, voting mechanism within said casing, a door thereto which when closed locks and secures said voting mechanism to permit it to be moved without danger of disturbing the parts, said door being mounted when in use to serve also as one of the doors to said booth when open, and a connection from said door to said voting mechanism through which the swinging of said door to different positions will operate to shift the mechanism to permit varying operations, substantially as set forth.

2. The combination, in a voting-machine, of the casing, the voting mechanism, locking and securing devices, a horizontally-moving bar connected with said locking and securing devices for manipulating them, a door to said machine which when closed locks the voting mechanism, and a connection consisting of a link pivoted to a point on said door behind its hinge at one end and to said horizontally-moving bar at its other end, whereby as said door is swung to different positions the mechanism is adjusted to permit varying operations, substantially as set forth.

3. The combination, in a voting-machine, of the frame or casing, the voting mechanism including horizontally-moving bars having catches pivoted to one end to engage with one locking-bar when operated and engaging points at another part to engage another locking-bar when they are not to be operated, said locking-bars one of which is mounted in a vertical position adjacent to the ends of said horizontal bars on pivoted swinging links, whereby when it descends it swings against the ends of the operated horizontal bars and returns them to their initial positions, and the other operating parts, substantially as set forth.

4. The combination, in a voting-machine, of horizontally-moving bars, pivoted catches secured to one end thereof, said catches being provided with tailpieces, the framework provided with a projecting portion which passes alongside said tailpieces, whereby said catches are positively forced up and down as said bars are reciprocated, and the locking-frame, substantially as set forth.

5. The combination, in a voting-machine, of an outer case or frame; an interior framework composed of vertical plates, transverse rectangular sections, and longitudinal bars arranged between said transverse sections, the whole being firmly secured together; horizontally-moving bars resting in the interstices between the rectangular sections and the longitudinal bars; and levers pivoted to said longitudinal bars, whereby said horizontal bars may be moved, substantially as set forth.

6. The combination, in a voting-machine, of a series of horizontally-moving bars bearing pivoted catches at one end, means for operating said pivoted catches, a locking-bar carrying detents with which said catches are adapted individually to engage as said horizontal bars are respectively moved, swinging links upon which said locking-bar is mounted, and a horizontally-moving bar having a cam engaging with said locking-bar whereby it may be raised and lowered, substantially as set forth.

7. The combination, in a voting-machine, of a single locking-bar for the whole-ticket-voting mechanism, a series of locking-bars for the individual-name-voting mechanism, said bars being movable and connected to voting or registering mechanism, whereby the voting is done by moving them, a locking-bar adapted to lock either the whole-ticket-voting mechanism or the individual-name-voting mechanism from operation while the other variety is free to operate, and means for throwing said locking-bar into engagement with either variety of bars.

8. The combination, in a voting-machine, of a locking-bar for the whole-ticket-voting mechanism having a thickened end; a series of locking-bars for the individual-name-voting mechanism having hooked ends; a vertically-moving locking-bar, the upper end whereof is adjacent to the thickened end of said first-mentioned bar, and which is provided with a series of hooks equal in number to the locking-bars for the individual-name-voting mechanism; and means for moving said locking-bar so that either its upper end shall lock the whole-ticket-voting mechanism, or its hooks lock the individual-name-voting mechanism, whereby one variety is held locked while the other is free to be operated in the process of voting.

9. The combination, in a voting-machine, of the locking-bar D, the series of locking-bars E, a locking-bar adapted to engage with said bar D when in one position and with said bars E when in another position, a rock-shaft bearing a cam whereby said locking-bar may be raised, an arm also on said rock-shaft, a horizontally-moving bar bearing a pivoted catch with which when in one position said arm on said rock-shaft will engage, and means for moving said last-named bar, whereby a disengagement of said arm is effected.

10. The combination, in a voting-machine, of the bar D, the series of bars E, said bars being movable and connected to voting or registering mechanism whereby the voting is done by moving them, a locking-bar whereby either variety of bar may be locked while the other is permitted to operate, means for operating said locking-bar, and means for preventing the unlocking of said bar until the voter has departed from the booth, whereby duplicate voting is effectually prevented, substantially as set forth.

11. The combination, in a voting-machine, of a series of locking-bars, a series of levers pivoted alongside said locking-bars, each formed with a point on one side, pins in said locking-bars alongside said points adapted when one has been operated to lock the other levers, a series of registers corresponding to the levers, means whereby when any bar has been moved in voting any second movement is prevented, and means for restoring the machine to condition for voting consisting of the exit-door to the booth and connections between said exit-door and the voting mechanism.

12. The combination, in a voting-machine, of a locking-bar carrying several projections, and levers pivoted alongside said locking-bar and crossing the same adjacent thereto and provided with projections extending over and adapted to hook around the said projections on the locking-bar, said projections being formed as described so that when the bar has been moved by one of said levers said projections prevent any effectual movement of either of the other levers, thus preventing duplicate voting, substantially as set forth.

13. The combination, in a voting-machine, of a bar, pins or projections thereon, and levers pivoted alongside said bar and extending across the same and provided with projections, the faces of the ends of which are in line with the sides of the projections on the bar farthest from the handles of the levers, but which are cut away next the body of the levers, substantially as and for the purposes set forth.

14. The combination, in a voting-machine, of the casing, the voting mechanism, including a locking-bar, levers L pivoted alongside said locking-bar and extending across the same and formed with projections $l$ on their sides intermediate their ends, projections on said locking-bar alongside said levers, which, when it has been moved by one of said levers, come under said projections on the others and lock them from operation, registers positioned opposite the other ends of said levers and connected thereto, and means for locking said locking-bar when it has been moved, substantially as set forth.

15. The combination, in a voting-machine, of the frame or casing, the voting mechanism, including levers, the handles of one set of levers projecting out slightly beyond the face of the casing, and a door having recesses in its inner side and adapted to close onto and lock said levers, substantially as and for the purposes set forth.

16. The combination, in a voting-machine, of the frame or casing, voting mechanism within said frame or casing, handles whereby said mechanism is manipulated projecting therefrom and extending out beyond the face thereof, and a door to said frame or casing recessed upon its inner side and adapted to close onto and lock said handles to a determinate position when said door is closed and locked, substantially as and for the purposes set forth.

17. The combination, in a voting-machine, of the voting mechanism mounted in a suitable casing, levers to operate said mechanism mounted with their ends adjacent to the door to said casing, and said door mounted to engage said ends when it is closed and secure said levers from being moved until said door is opened, substantially as set forth.

18. The combination, in a voting apparatus, of a booth which the voter enters for the purpose of voting, a voting-machine therein containing voting and registering mechanism, a door to said machine which is adapted to stand at right angles therewith and form the exit-door to the booth, and connections from said door to said mechanism, whereby, as the door is pushed onward by the voter in departing from the booth, the mechanism is set ready for the next voter.

19. The combination, in a voting apparatus, of the booth, and the self-contained voting-machine adapted to be situated within said booth during the time the voting is in progress and removed when the voting is finished to a place where the returns are made up by the election of officers, said machine being provided with a door which when closed and locked not only closes the machine but also engages the operating-levers of the voting mechanism within, and holds them from movement, whereby any disturbance of the parts during moving is prevented, substantially as set forth.

20. The combination, in a voting-machine, of the booth, the voting mechanism, a door to the machine, and connections between said door and said mechanism, said parts being arranged as described so that the door when standing at right angles with the machine will form the exit-door to the booth, when swung entirely open will unlock the voting-bars, and when returned to right angles with the voting-machine will set the machine for the next voter.

21. The combination, in a voting apparatus, of the booth, a voting-machine within said booth and separate therefrom, a door to said machine adapted to close and lock the same and arranged to also form the exit-door of the booth when the parts are in operative relation and said door is open, the voting mechanism contained in said machine comprising registers and devices for operating the same, said operating devices arranged to be operated and locked in such position while said exit-door stands across said booth, a connection between said door and said mechanism which operates, when said door is swung back, to permit the exit of the voter, to release said locked parts and return them to their initial positions ready for the next operation, substantially as set forth.

In witness whereof we have hereunto set our hands and seals, at Frankfort, Indiana, this 24th day of July, A. D. 1897.

WILLIAM R. CUNNINGHAM. [L. S.]
  THOMAS MAJOR. [L. S.]

Witnesses:
 DAVID A. COUTH,
 FREDERICK H. KRAMER.